US012094440B2

(12) United States Patent
Sato et al.

(10) Patent No.: US 12,094,440 B2
(45) Date of Patent: Sep. 17, 2024

(54) ELECTRONIC MUSICAL INSTRUMENT, SOUND PRODUCTION METHOD FOR ELECTRONIC MUSICAL INSTRUMENT, AND STORAGE MEDIUM

(71) Applicant: CASIO COMPUTER CO., LTD., Tokyo (JP)

(72) Inventors: Hiroki Sato, Tokyo (JP); Hajime Kawashima, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 646 days.

(21) Appl. No.: 17/344,804

(22) Filed: Jun. 10, 2021

(65) Prior Publication Data

US 2021/0407474 A1 Dec. 30, 2021

(30) Foreign Application Priority Data

Jun. 24, 2020 (JP) ................................ 2020-109089

(51) Int. Cl.
*G10H 1/00* (2006.01)
*G10H 1/14* (2006.01)
*G10H 1/46* (2006.01)

(52) U.S. Cl.
CPC ............. *G10H 1/0008* (2013.01); *G10H 1/14* (2013.01); *G10H 1/46* (2013.01); *G10H 2210/066* (2013.01); *G10H 2210/571* (2013.01)

(58) Field of Classification Search
CPC .......... G10H 1/0008; G10H 1/14; G10H 1/46; G10H 2210/066; G10H 2210/571
(Continued)

(56) References Cited

U.S. PATENT DOCUMENTS

2012/0073424 A1* 3/2012 Hashimoto .......... G10H 1/0008 84/622
2015/0101474 A1* 4/2015 Yasuraoka ............... G10G 1/00 84/609
(Continued)

FOREIGN PATENT DOCUMENTS

CN 108630187 A * 10/2018 ........... G10H 1/0008
JP S62164095 A * 7/1987
(Continued)

OTHER PUBLICATIONS

Japanese Office Action dated Apr. 19, 2022 in a counterpart Japanese patent application No. 2020-109089. (A machine translation (not reviewed for accuracy) attached.).

*Primary Examiner* — Christina M Schreiber
(74) *Attorney, Agent, or Firm* — CHEN YOSHIMURA LLP

(57) ABSTRACT

An electronic musical instrument includes: a plurality of performance elements that specify pitch data; a sound source that produces musical sounds; and a processor configured to perform the following: when a user performance of the plurality of performance elements satisfies a prescribed condition, instructing the sound source to produce a sound of a first timbre and a sound of a second timbre, both corresponding to a pitch data specified by the user performance; and when the user performance of the plurality of performance elements does not satisfy the prescribed condition, instructing the sound source to produce the sound of the first timbre corresponding to the pitch data specified by the user performance and not instructing the sound source to produce the sound of the second timbre.

10 Claims, 6 Drawing Sheets

(58) Field of Classification Search
USPC ............................................................ 84/609
See application file for complete search history.

(56) References Cited

U.S. PATENT DOCUMENTS

| | | | | |
|---|---|---|---|---|
| 2018/0342228 A1* | 11/2018 | Wei | ...................... | G10H 1/0016 |
| 2019/0051276 A1* | 2/2019 | Lathrop | ................... | G10G 1/02 |
| 2019/0096378 A1* | 3/2019 | Sato | ........................ | G10H 7/045 |
| 2021/0407474 A1* | 12/2021 | Sato | ......................... | G10H 1/46 |
| 2021/0407480 A1* | 12/2021 | Sato | ........................ | G10H 1/386 |
| 2022/0406282 A1* | 12/2022 | Sato | ........................ | G10H 7/008 |
| 2023/0041040 A1* | 2/2023 | Sato | ......................... | G10H 1/24 |

FOREIGN PATENT DOCUMENTS

| | | | | | |
|---|---|---|---|---|---|
| JP | H5-165477 | A | | 7/1993 | |
| JP | H6-250655 | A | | 9/1994 | |
| JP | H06250655 | A | * | 9/1994 | |
| JP | H07306679 | A | * | 11/1995 | |
| JP | H08339186 | A | * | 12/1996 | |
| JP | 2005070167 | A | * | 3/2005 | |
| JP | 3667387 | B2 | * | 7/2005 | |
| JP | 2007256412 | A | * | 10/2007 | |
| JP | 4492923 | B2 | * | 6/2010 | |
| JP | 2016-173599 | A | | 9/2016 | |
| JP | 2019061015 | A | * | 4/2019 | ............. G09B 15/00 |
| JP | 2023022574 | A | * | 2/2023 | ........... G10H 1/0008 |

* cited by examiner

ELECTRONIC MUSICAL INSTRUMENT, SOUND PRODUCTION METHOD FOR ELECTRONIC MUSICAL INSTRUMENT, AND STORAGE MEDIUM

BACKGROUND OF THE INVENTION

Technical Field

The present disclosure relates to an electronic musical instrument, a sound production method for an electronic musical instrument, and a storage medium therefor.

Background Art

Some electronic musical instruments are equipped with a layer function for simultaneously playing two or more timbres. See, e.g., Japanese Patent Application Laid-Open Publication No. 2016-173599. This is a function by an electronic keyboard instrument that can produce sounds that reproduce the heavy unison performance of a piano and strings in an orchestra; that is, simultaneously generating the piano sound and the strings sound.

SUMMARY OF THE INVENTION

The features and advantages of the invention will be set forth in the descriptions that follow and in part will be apparent from the description, or may be learned by practice of the invention.

The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides an electronic musical instrument that includes: a plurality of performance elements that specify pitch data; a sound source that produces musical sounds; and a processor configured to perform the following: when a user performance of the plurality of performance elements satisfies a prescribed condition, instructing the sound source to produce a sound of a first timbre and a sound of a second timbre, both corresponding to a pitch data specified by the user performance; and when the user performance of the plurality of performance elements does not satisfy the prescribed condition, instructing the sound source to produce the sound of the first timbre corresponding to the pitch data specified by the user performance and not instructing the sound source to produce the sound of the second timbre.

In another aspect, the present disclosure provides a method of sound production performed by a processor in an electronic musical instrument that includes, in addition to the processor, a plurality of performance elements that specify pitch data and a sound source that produces musical sounds, the method including via said processor: when a user performance of the plurality of performance elements satisfies a prescribed condition, instructing the sound source to produce a sound of a first timbre and a sound of a second timbre, both corresponding to a pitch data specified by the user performance; and when the user performance of the plurality of performance elements does not satisfy the prescribed condition, instructing the sound source to produce the sound of the first timbre corresponding to the pitch data specified by the user performance and not instructing the sound source to produce the sound of the second timbre.

In another aspect, the present disclosure provides a non-transitory computer-readable storage medium storing a program executable by a processor in an electronic musical instrument that includes, in addition to the processor, a plurality of performance elements that specify pitch data and a sound source that produces musical sounds, the program causing the processor to perform the following: when a user performance of the plurality of performance elements satisfies a prescribed condition, instructing the sound source to produce a sound of a first timbre and a sound of a second timbre, both corresponding to a pitch data specified by the user performance; and when the user performance of the plurality of performance elements does not satisfy the prescribed condition, instructing the sound source to produce the sound of the first timbre corresponding to the pitch data specified by the user performance and not instructing the sound source to produce the sound of the second timbre.

It is to be understood that both the foregoing general description and the following detailed description are exemplary and explanatory, and are intended to provide further explanation of the invention as claimed.

DETAILED DESCRIPTION OF EMBODIMENTS

Figure 1:
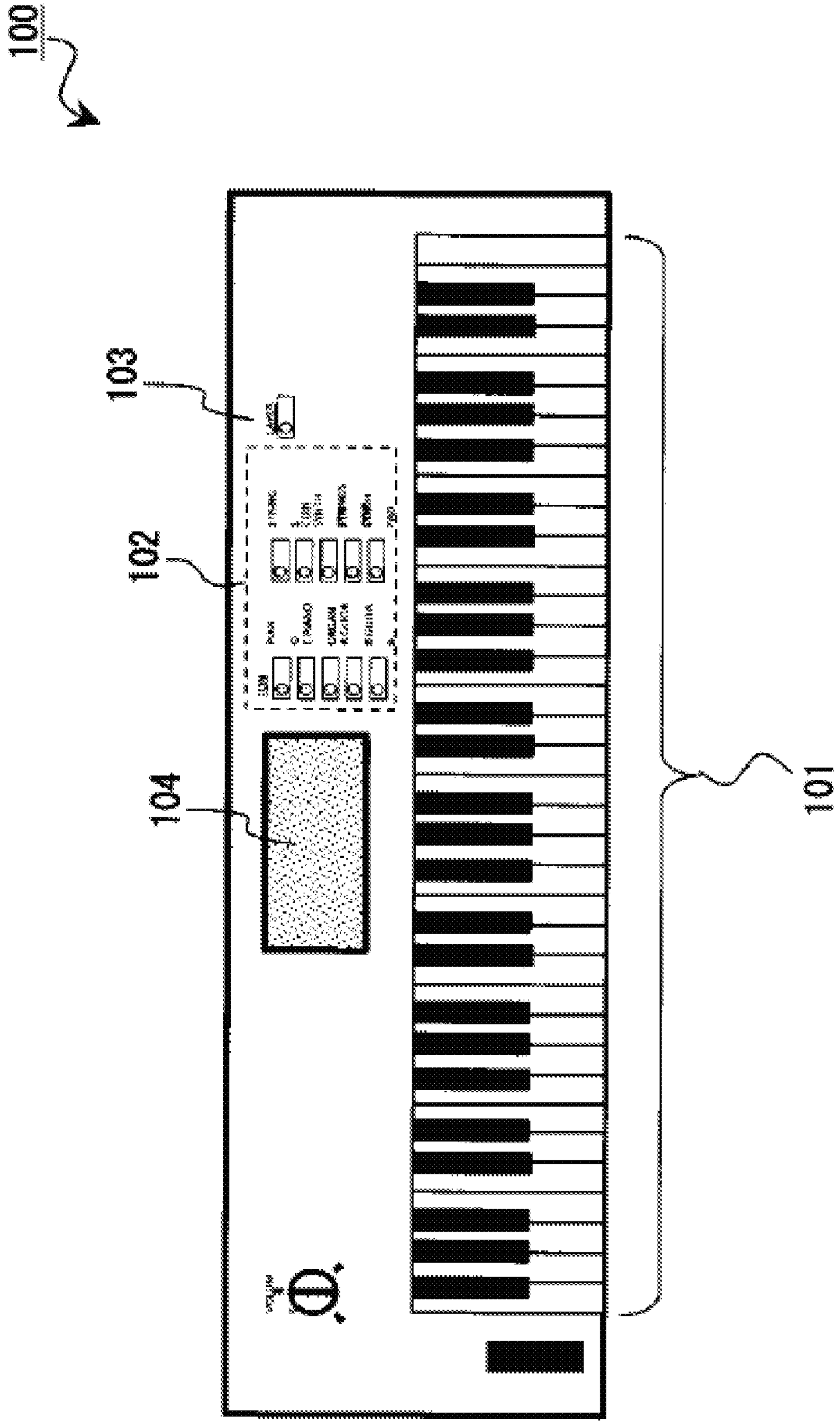
FIG. 1 is a figure that shows an external appearance example of one embodiment of an electronic keyboard instrument of the present invention.

Hereinafter, embodiments for carrying out the present disclosure will be described in detail with reference to the drawings. FIG. 1 is a diagram showing an external appearance example of an embodiment 100 of an electronic keyboard instrument. The electronic keyboard instrument 100 includes a keyboard 101 composed of multiple keys (operation elements) (for example, 61 keys), a TONE button 102 group, a LAYER button 103, and an LCD 104 (Liquid Crystal Display) that displays various setting information. In addition, the electronic keyboard instrument 100 includes a volume knob, a pitch bend, a bender/modulation wheel for performing various modulations, and the like. Further, although not particularly shown, the electronic keyboard instrument 100 is provided with a speaker(s) for emitting a musical sound generated by the performance on a back surface, side surfaces, a rear surface, or the like.

The performer can select a timbre by means of a group 102 of 10 TONE buttons 102 arranged in the TONE section (broken line 102) on the upper right panel of the electronic keyboard instrument 100, for example. Similarly, the layer timbre setting mode can be set or canceled by pressing the LAYER button 103 on the upper right panel.

In the state where the layer timbre setting mode is canceled, the LED (Light Emitting Diode) of the LAYER button 103 is turned off, and the performer selects the basic timbre (first timbre) described later by the TONE button 102. The LED of the TONE button 102 of the selected timbre then lights up.

When the performer presses the LAYER button 103 in this state, the layer timbre setting mode is set and the LED of the LAYER button 103 lights up. In this layer timbre setting mode setting state, the TONE button 102 is used for selecting the layer timbre, and when the performer selects the TONE button 102, the LED of the selected TONE button 102 blinks. You cannot select the same timbre as the basic timbre.

When the performer presses the LAYER button 103 again in this state, the layer timbre setting mode is canceled, and the LED of the TONE button 102 of the timbre that has been blinking is turned off.

Figure 2:
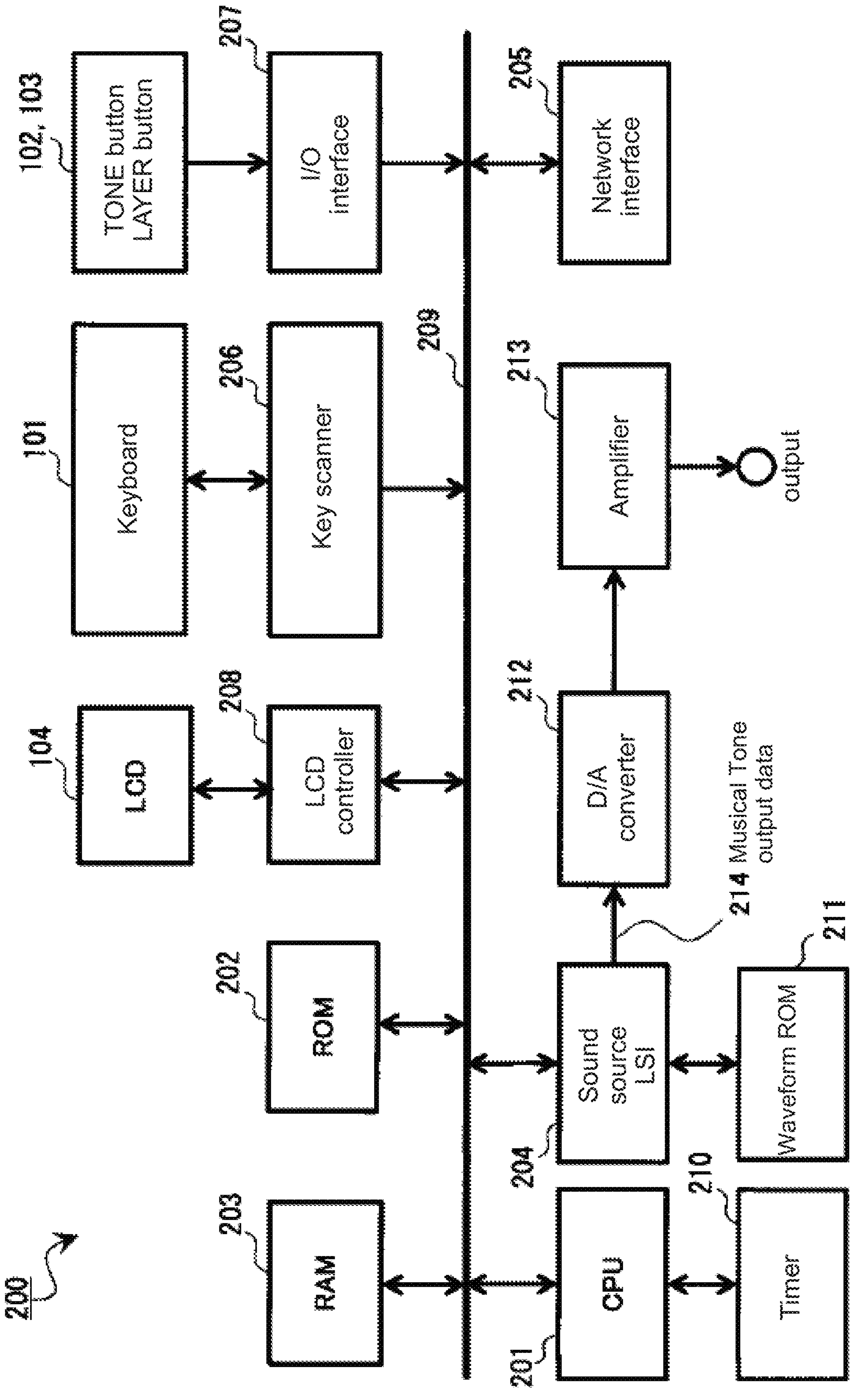
FIG. 2 is a block diagram showing a hardware configuration example of an embodiment of a control system in the main body of the electronic keyboard instrument

FIG. 2 is a diagram showing a hardware configuration example of an embodiment of the control system 200 in the main body of the electronic keyboard instrument 100 of FIG. In FIG. 2, the control system 200 includes a CPU (central processing unit) 201, which is a processor, a ROM (read-only memory) 202, a RAM (random access memory) 203, a sound source LSI (large-scale integrated circuit) 204, which is a sound source, a network interface 205, a key scanner 206 to which the keyboard 101 of FIG. 1 is connected, an I/O interface 207 to which the TONE button 102 group and the LAYER button 103 of FIG. 1 are connected, and an LCD controllers 208 to which the LCD 104 of FIG. 1 is connected, which are connected to a system bus 209, respectively. The musical tone output data 214 output from the sound source LSI 204 is converted into an analog musical tone output signal by the D/A converter 212. The analog musical tone output signal is amplified by the amplifier 213 and then output from a speaker or an output terminal (not shown).

The CPU 201 executes control operations of the electronic keyboard instrument 100 of FIG. 1 by executing a control program stored in the ROM 202 while using the RAM 203 as the work memory.

Figure 4:
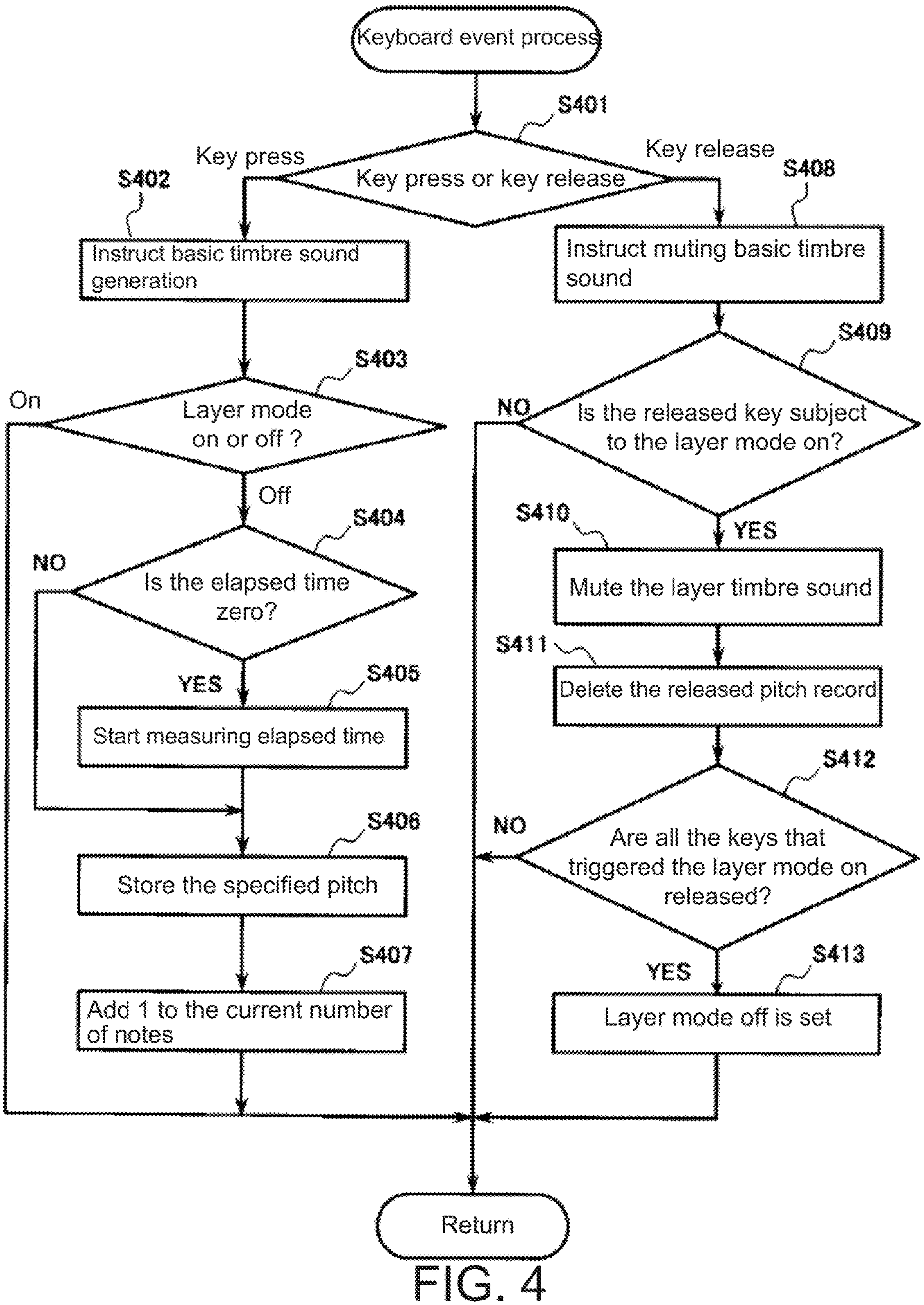
FIG. 4 is a flowchart showing an example of the keyboard event processing.

The key scanner 206 constantly scans the key-pressed/released state of the keyboard 101 of FIG. 1, generates an interrupt of the key event of FIG. 4, and transmits the change in the key-pressed state of the key on the keyboard 101 to the CPU 201. When this interrupt occurs, the CPU 201 executes a keyboard event processing, which will be described later, using the flowchart of FIG. 4. In this keyboard event processing, when a keyboard event of a key press occurs, the CPU 201 instructs the sound source LSI 204 to produce the first musical tone of the basic timbre (first timbre) corresponding to the pitch data of the new key press.

The I/O interface 207 detects the operating state of the TONE button 102 group and the LAYER button 103 in FIG. 1 and informs the CPU 201 of the status.

A timer 210 is connected to the CPU 201. The timer 210 generates an interrupt at regular time intervals (for example, 1 millisecond). When this interrupt occurs, the CPU 201 executes an elapsed time monitoring process described later using the flowchart of FIG. 5. In this elapsed time monitoring process, the CPU 201 determines whether or not a prescribed performance operation has been executed by the performer on the keyboard 101 of FIG. 1. For example, in the elapsed time monitoring process, the CPU 201 determines a performer's operation of playing a chord using a plurality of keys on the keyboard 101. More specifically, in the elapsed time monitoring process, the CPU 201 measures an elapsed time between the above-mentioned keyboard events generated from the key scanner 206 when any of the above keys is pressed using the keyboard 101 of FIG. 1, and determine whether the number of keys pressed within a preset elapsed time that can be regarded as simultaneous key press reaches a preset number of notes that can be regarded as chord playing. Then, if that determination is yes, the CPU 201 instructs the sound source LSI 204 to generate the second musical tone of the layer timbre corresponding to the pitch data group of the keys pressed within the elapsed time. Along with this operation, the CPU 201 sets the layer mode on.

In the present application, the layer timbre means a timbre (second timbre) that is superimposed on the basic timbre (first timbre). The “layer mode on” means that the layer timbre is superimposed on the basic timbre and the layer timbre and the basic timbre are sounded in unison, and the “layer mode off” means that only the basic timbre is sounded.

In the above-mentioned keyboard event processing, when a key release keyboard event occurs while the CPU 201 is in a state where the above-mentioned layer mode on is set, the CPU instructs the sound source LSI 204 to mute the first musical tone of the basic timbre for which the corresponding key is released and to mute the second musical tone of the layer timbre for which the corresponding key is released. The CPU 201 sets the layer mode off when it instructs the sound source LSI 204 to mute the first musical tones of all the basic timbres and the second musical tones of all the layer timbres. Here, the CPU 201 determines whether or not the number of keys pressed during the preset elapsed time that defines simultaneous key pressing period has reached the above-mentioned preset number of notes that can be regarded as a chord playing while the layer mode off is set.

A waveform ROM 211 is connected to the sound source LSI 204. According to the sound production instructions from the CPU 201, the sound source LSI 204 starts reading the musical tone waveform data 214 from the waveform ROM 211 at a speed corresponding to the pitch data included in the sound production instructions, and outputs the data to the D/A converter 212. The sound source LSI 204 may have, for example, the ability to simultaneously produce a maximum of 256 voices by time division processing. According to mute instructions from the CPU 201, the sound source LSI 204 stops reading the musical tone waveform 214 corresponding to the mute instructions from the waveform ROM 211, and ends the sound production of the musical note corresponding to the mute instructions.

The LCD controller 208 is an integrated circuit that controls the display state of the LCD 104 of FIG. 1.

The network interface 205 is connected to a communication network such as Local Area Network (LAN), and receives control programs (see the flowcharts of keyboard event processing and the elapsed time monitoring processing described later) and/or data used by the CPU 201 from an external device. Then, they can be loaded into RAM 203 or the like and used.

An operation example of the embodiment shown in FIGS. 1 and 2 will be described. The condition (the layering condition or superimposition condition) for determining the chord playing for starting the sound production of the layer timbre is that a chord playing by pressing N or more notes occurs almost at the same time (within T seconds). When it is determined that this condition is satisfied, the layer mode is turned on until all the keys corresponding to the pressed keys for which the determination is made are released, and the sound production instructions only for the first musical tones of the basic timbre and second musical tones of the layer timbre of keys that established the chord at the time when the determination is made are issued to the sound source LSI 204. As a result, the sound source LSI 204 produces the first musical tones of the basic timbre and the second musical tones of the layer timbre in unison.

In the layer mode on state, the layer mode on state is maintained even if some of the keys for which the above determination is made are released and the number of notes becomes less than N. When all the keys with which the above determination is made are released, the layer mode is turned off.

In addition, once the layer mode is turned on, as long as that state is maintained, the musical tone of the pitch corresponding to a new key press is produced with the basic timbre (i.e., not with the layer timbre) no matter what the performer plays.

The number of played notes N that is regarded as a chord playing and the elapsed time T that defines simultaneous key pressing period may be set for each timbre separately.

Figure 3:
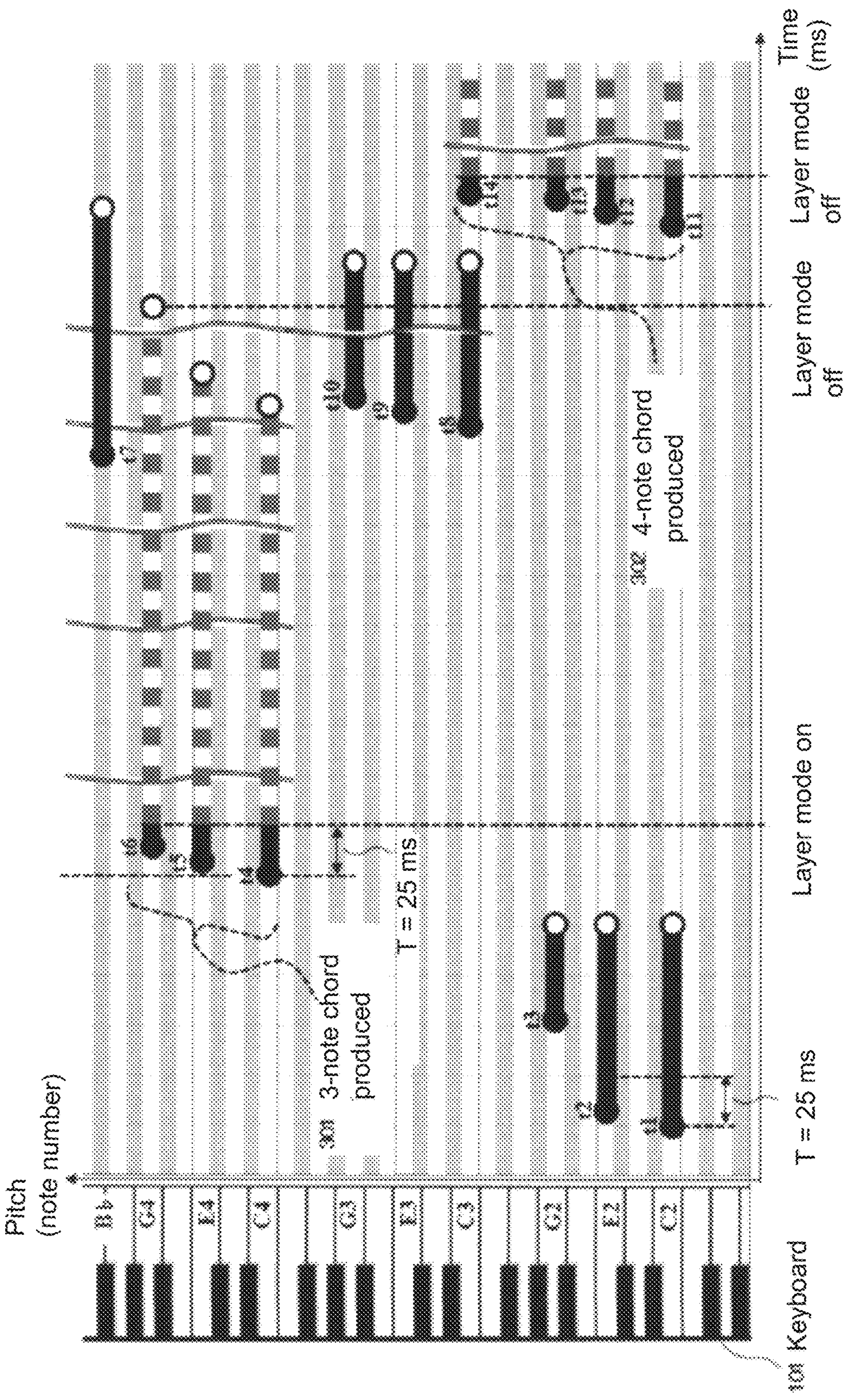
FIG. 3 is an explanatory drawing (first example) showing an operation example of an embodiment.

FIG. 3 is an explanatory diagram (first example) showing an operation example of the present embodiment. The vertical axis represents the pitch (note number) played on the keyboard 101, and the horizontal axis represents the passage of time (unit: milliseconds). The position of the black circle represents the note number and time of the key in which the key was pressed, and the position of the white circle represents the note number and time of the key in which the key was released. In FIG. 3, numbers t1 to t14 are assigned in the order of key pressing events. The solid black line following the black circle indicates that the key is being pressed, and indicates the period during which the basic timbre is being produced. The part changed to the gray broken line indicates the period during which the basic timbre (first timbre) and the layer timbre (second timbre) are produced in unison. In the example of FIG. 3, the prescribed elapsed time T during which the keys are considered to be pressed at the same time is set to, for example, 25 msec (milliseconds), and the prescribed number of played notes N that is regarded as a chord playing is set to, for example, three or more notes.

First, when the key press event t1 occurs in the layer mode off state, the sound production of the basic timbre of pitch C2, for example, is started (the black solid line period of t1), and measurement of the elapsed time is started. Subsequently, the key pressing event t2 occurs within 25 milliseconds from the occurrence of the key pressing event t1, and the sound production of the basic timbre of the pitch E2 is started (the black solid line period of t2). Further, the key pressing event t3 occurs, and the sound production with the basic timbre of the pitch G2 is started (the black solid line period of t3), but the key pressing event t3 occurs after more than 25 milliseconds have passed since the occurrence of the key pressing event t1. Thus, the number of key presses during the elapsed time T=25 milliseconds since the first key press event t1, which defines simultaneous key pressing period, is 2, which is less than the number of the pressed keys N=3 that can be regarded as a chord playing. In this case, therefore, for the key press events t1, t2, and t3, the second musical tone of the layer timbre is not produced, and the first musical tones of the basic timbre indicated by the respective black solid lines in the t1, t2, and t3 parts are produced (that is, the layering condition is not satisfied).

After that, the key press event t4 occurs, the sound production of the basic timbre of the pitch C4 is started (the black solid line period of t4), and measurement of the elapsed time is started again. Subsequently, the key pressing events t5 and t6 occur within the elapsed time T=25 milliseconds, which are considered to be the same time key pressing events as the key pressing event t4, and the sound production of the basic timbre of pitches E4 and G4 starts (the black solid line period of t5 and t6). As a result, the number of notes at the time when T=25 milliseconds has elapsed from the occurrence of the key press event t4 becomes 3, and the number of the pressed keys for the chord playing determination, N=3 or more, is satisfied (i.e., the layering condition is satisfied). In this case, for the key press events t4, t5, and t6, as shown by the gray dashed line, in addition to the sound production of the first musical tones of the basic timbre, the sounds of three-note chord of pitches C4, E4, and G4 are produced with the second tones of the layer timbre (301 in FIG. 3). At the same time, the layer mode on is set.

Then, while the layer mode is kept on, the key press event t7 occurs, and the sound production of the first musical tone with the basic timbre of pitch B4♭ (the black solid line period of t7) is started, but the three keys corresponding to the key press events t4, t5, and t6 have not been released, and the layer mode on state is maintained. In this case, for the key press event t7, the second musical tone of the layer timbre is not produced, and only the first musical tone of the basic timbre indicated by the solid black line of t7 is produced (i.e., the layering condition is not met).

Then, the key pressing events t8, t9, and t10 occur within the elapsed time T=25 ms form each other, which are considered to be simultaneously pressed, and the sound production of the first musical tones with the basic timbre of pitches C3, E3, and G3, respectively, (the black solid line periods of t8, t9, and t10) is started, but the three keys corresponding to the key pressing events t4, t5, and t6 have not been released and the layer mode on state is still maintained. In this case as well, for the key press events t8, t9, and t10, the second musical tone of the layer timbre is not produced, and the first musical tones of the basic timbre indicated by the solid black lines of t8, t9, and t10 are produced (i.e., the layering condition is not met).

The key press event t4 is released at the timing of the white circle in t4, and the sound production of the first musical tone of the basic timbre and the sound production of the second musical tone of the layer timbre corresponding to the key press event t4 (the gray dashed period of t4) are terminated, but the sound production of the first musical tones of the basic timbre and the sound production of the second musical tones of the layer timbre corresponding to the key press events t5 and t6 (each gray dashed period of t5 and t6) are continued. When the key press event t5 is released (at the timing of the white circle in t5), the sound production of the first musical tone of the basic timbre and the sound production of the second musical tone of the layer timbre corresponding to the key pressing event t5 (the gray dashed period of t5) are terminated (muted). However, the sound production of the first musical tone of the basic timbre and the sound production of the second musical tone of the layer timbre corresponding to the key press event t6 (the period of the gray dashed line of t6) are continued. Then, when the key press event t6 is also released (at the timing of the white circle in t6), the sound production of the first musical tone of the basic timbre and the sound production of the second musical tone of the layer timbre corresponding to the key press event t6 (the gray dashed period of t6) are terminated (muted). Since the release of all the keys corresponding to the key press events t4, t5, and t6 that have triggered the layer mode on is completed, the layer mode on is canceled and the layer mode is turned off.

After the layer mode off is set, the key press event t11 occurs, the sound production of the first musical tone with the basic timbre of pitch C2 (the black solid line period of t11) is started, and the measurement of the elapsed time starts. Subsequently, the key pressing events t12, t13, and t14 occur within 25 milliseconds from the occurrence of the key pressing event t11, and the sound production of the corresponding first musical tones with the basic timbre of the pitch E2, G2, and C3 (the black solid line periods of t12, t13, and t14) is started. As a result, the number of musical tones at the time when T=25 milliseconds has elapsed from the occurrence of the key press event t11 becomes 4, and the number of the pressed notes N=3 or more for a chord playing is satisfied (i.e., the layering condition is satisfied). Therefore, for the key press events t11, t12, t13, and t14, as shown by the gray dashed lines, in addition to the sound production of the first musical tones of the basic timbre, the second musical tones of the layer timbre are produced with the four-note chord of the pitches C2, E2, G2, and C3 (302 in FIG. 3). And again, the layer mode on is set.

FIG. 4 is a flowchart showing an example of the keyboard event processing executed by the CPU 201 of FIG. 2. As described above, this keyboard event processing is executed based on the interrupt generated when the key scanner 206 of FIG. 2 detects a change in the key pressing/releasing state of the keyboard 101 of FIG. 2. This keyboard event processing is, for example, a process in which the CPU 201 loads a keyboard event processing program stored in the ROM 202 into the RAM 203 and executes it. This program may be loaded from the ROM 202 to the RAM 203 when the power of the electronic keyboard instrument 100 is turned on and may stay there.

In the keyboard event processing illustrated in the flowchart of FIG. 4, the CPU 201 first determines whether the interrupt notification from the key scanner 206 indicates a key press event or a key release event (step S401).

When it is determined in step S401 that the interrupt notification indicates a key press event, the CPU 201 instructs the sound source LSI 204 to produce sound of the first musical tone of the basic timbre with a pitch indicated by the pitch data (note number) included in the interrupt notification indicating the key press event (step S402). The performer can specify the basic timbre by pressing any of the TONE buttons 102 in FIG. 1 in advance, and the specified basic timbre is held as a variable in the RAM 203. The selectable basic timbres (first timbre) may include at least one of an acoustic piano, an acoustic guitar, and a marimba. This state corresponds to the starting point of each of the black solid lines of the key pressing events t1 to t14 in the operation explanatory diagram of FIG. 3 described above, and the sound source LSI 204 starts the sound production of the corresponding first musical tone of the basic timbre from the corresponding start time.

Next, the CPU 201 determines whether the layer mode is currently on or off (step S403). In this process, whether the layer mode is on or not is determined depending on whether the logical value of a predetermined variable (hereinafter, this variable is referred to as a "layer mode variable") stored in the RAM 203 of FIG. 2, for example, is on or off.

If it is determined in step S403 that the layer mode is currently on, the flow chart of the current keyboard event processing shown in the flowchart of FIG. 4 is terminated without executing the processes towards the layer mode on, and the process returns to the main program processing (not shown). This state corresponds to the keyboard event processing when the key press events t7 to t10 in the operation explanatory diagram of FIG. 3 described above occur, and the first sound source LSI 204 only performs the sound production of the first musical tones of the basic timbre in accordance with the sound production instructions in step S402.

If it is determined in step S403 that the layer mode is currently off, the CPU 201 determines whether or not the elapsed time for shifting to the layer mode on is zero (step S404). The elapsed time is held as the value of a predetermined variable (hereinafter, this variable is referred to as an "elapsed time variable"), for example, in the RAM 203 of FIG. 2.

When it is determined that the elapsed time is 0 (when the determination in step S404 is YES), the CPU 201 starts interrupt processing by the timer 210 and starts measuring the elapsed time (step S405). This state corresponds to the processing when the key pressing event t1, t4, or t11 in the operation explanatory diagram of FIG. 3 described above occurs, and the measurement of the elapsed time for shifting to the layer mode on is started at the timing at which the corresponding key press event of t1, t4, or t11 of FIG. 3 occurs.

When it is determined that the elapsed time is not 0 (when the determination in step S404 is NO), the elapsed time for shifting to the layer mode on has already been measured, and therefore, the start of the measurement of the elapsed time in step S405 is skipped. This state corresponds to the process that is performed when any one of the key pressing events t2, t5, t6, t12, t13, and t14 occurs in the operation explanatory diagram of FIG. 3 described above.

After the measurement of the elapsed time for shifting to the layer mode on is started in step S405, or the determination in step S404 is NO because the measurement of the elapsed time has been already started, the CPU 201 stores the pitch data whose sound production is instructed in the key press event (the note number whose sound production with the basic timbre is instructed in step S402) in RAM 203, for example, as a candidate for sound production with the layer timbre (step S406).

After that, the CPU 201 adds 1 to the value of a variable on the RAM 203 (hereinafter, this variable is referred to as the "current number of notes" variable) for counting the current number of tones that are considered to be pressed at the same time so as to update the value of the current number of notes variable (step S407). The value of this current number of notes variable is counted in order to compare it with the prescribed number of notes N that is regarded as being pressed at the same time when the elapsed time T has elapsed in the elapsed time monitoring process shown in the flowchart of FIG. 5 described later.

After that, the CPU 201 ends the current keyboard event processing shown in the flowchart of FIG. 4, and returns to the main program processing (not particularly shown).

By repeating the series of processes from steps S404 to S407 for each keyboard event process described above, as preparation for the transition from layer mode off to layer mode on, in the operation example of FIG. 3, the storing of the pitch data and counting up of the number of notes that are key-pressed, such as t1-t2, t4-t6, and t11-t14 within the elapsed time T, which are considered as being pressed as the same time, since the key press events t1, t4, and t4, respectively, are performed.

When it is determined in step S401 described above that the interrupt notification indicates a key release event, the CPU 201 instructs the sound source LSI 204 to mute the first musical tone of the basic timbre with the pitch data (note number) included in the interrupt notification indicating the key release event that has been produced by the sound source LSI 204 (see step S402) (S408). By this processing, in the operation example of FIG. 3 described above, each first musical tone of the basic timbre that has been produced by the sound source LSI 204 based on the occurrence of the corresponding key pressing event t1 to t14 is muted at the timing of the white circle (each solid black line period thereby ends).

Next, the CPU 201 determines whether or not the released key is the key for which the layer mode is turned on (step S409). Specifically, the CPU 201 determines whether or not the pitch data of the released key is included in the pitch data group (see step S406) of the candidates for the sound production with the layer timbre stored in the RAM 203.

If the determination in step S409 is NO, the CPU 201 ends the current keyboard event processing shown in the flowchart of FIG. 4, and returns to the main program processing (not particularly shown).

If the determination in step S409 is YES, the CPU 201 instructs the sound source LSI to mute the second tone of the layer timbre that has been produced by the sound source LSI with the pitch data (note number) included in the interrupt notification indicating the key release event (see step S504 in FIG. 5 to be described later)(S410). By this process, in the operation example of FIG. 3 described above, each second musical tone of the layer timbre that has been produced by the sound source LSI 204 in the corresponding gray dashed line period that started with the corresponding key press event t4 to t6 or t11 to t14 is muted at the timing of the white circle (that is, where the corresponding gray dashed line period ends).

Subsequently, the CPU 201 deletes the record of the pitch data of the released key from the pitch data group of the candidates for the sound generation of the layer timbre stored in the RAM 203 (see step S406) (step S411).

Thereafter, the CPU 201 determines whether or not all the keys that have triggered the layer mode on have been released (step S412). Specifically, the CPU 201 determines whether or not all the pitch data for the sound production of the layer timbre stored in the RAM 203 have been deleted.

If the determination in step S412 is NO, the CPU 201 ends the current keyboard event processing shown in the flowchart of FIG. 4, and returns to the main program processing (not particularly shown).

If the determination in step S412 is YES, the CPU 201 sets the layer mode off by setting the value of the layer mode variable stored in the RAM 203 to a value indicating off (step S413). In the operation example of FIG. 3 described above, this state corresponds to the timing at which the sound production of the first musical tone of the basic timbre of the key press event t6 and the sound production of the superimposed second musical tone of the layer timbre are muted (at the timing of the white circle at which the gray dashed line of t6 ends). In this way, the CPU 201 sets the layer mode off when the CPU 201 instructs the sound source LSI 204 to mute all the first musical tones of the basic timbre and all the second musical tones of the layer timbre that have been produced.

After that, the CPU 201 ends the current keyboard event processing shown in the flowchart of FIG. 4, and returns to the main program processing (not particularly shown).

Figure 5:
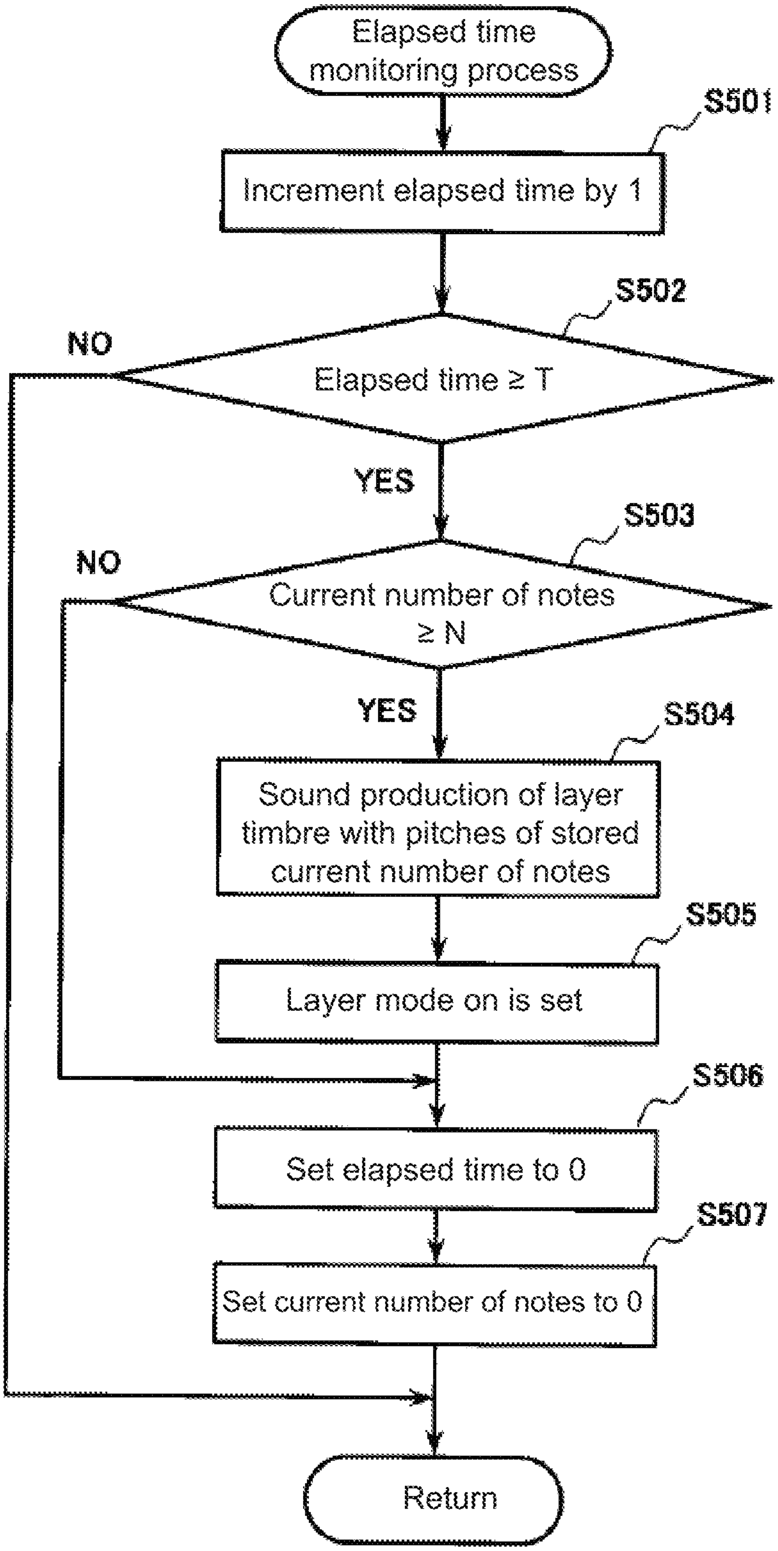
FIG. 5 is a flowchart showing an example of the elapsed time monitoring process.

FIG. 5 is a flowchart showing an example of the elapsed time monitoring process executed by the CPU 201 of FIG. 2. This elapsed time monitoring process is executed based on a timer interrupt that is generated, for example, every 1 millisecond in the timer 210 of FIG. 2. This elapsed time monitoring process is, for example, a process in which the CPU 201 loads an elapsed time monitoring processing program stored in the ROM 202 into the RAM 203 and executes it. This program may be loaded from the ROM 202 to the RAM 203 when the power of the electronic keyboard instrument 100 is turned on and may remain resident there.

In the elapsed time monitoring process exemplified by the flowchart of FIG. 5, the CPU 201 first increments (+1) the value of the elapsed time variable stored in the RAM 203 (step S501). The value of this elapsed time variable is cleared to a value of 0 in step S405 described above or step S506 described later. As a result, the value of the elapsed time variable indicates the elapsed time in milliseconds since the time of clearing. As described above, in the operation explanatory diagram of FIG. 3, the elapsed time is cleared to 0 at the occurrence timing of each key pressing event t1, t3, t4, or t11 (at the timing of each black circle), and then, measurement of the elapsed time for transitioning to the layer mode on is started.

Next, the CPU 201 determines whether or not the value of the elapsed time variable is equal to or greater than the elapsed time T, which defines a time period for simultaneous kay pressing (step S502).

When the determination in step S502 is NO, that is, when the value of the elapsed time variable is less than the elapsed time T, which defines a time period for simultaneous kay pressing, the current elapsed time monitoring process shown in the flowchart of FIG. 5 is terminated, and the process returns to the main program process (not shown) in order to accept further key pressing events described in the flowchart of FIG. 4.

When the determination in step S502 is YES, that is, when the elapsed time variable value becomes equal to or greater than the elapsed time T, which defines a time period for simultaneous kay pressing, the CPU 201 determines whether or not the value of the current number of notes variable stored in the RAM 203 (see step S407 of FIG. 4) is equal to or greater than the prescribed number of notes N (for example, 3) that would establish a chord playing (step S503).

If the determination in step S503 is YES, the CPU 201 instructs the sound source LSI 204 to produce second tones of the layer timbre with the pitch data of the notes indicated by the current number of notes variable stored in RAM 203 (see step S406 in FIG. 4) (step S504). As described above in the description of FIG. 1, the performer can specify the layer timbre by pressing the LAYER button 103 of FIG. 1 and then the TONE button 102 of FIG. 1 in advance. The specified layer timbre is held as a variable in the RAM 203. The selectable layer timbres (second timbre) may include at least one of strings and choir.

Subsequently, the CPU 201 sets the value of the layer mode variable stored in the RAM 203 to a value indicating "on," to set the layer mode on (step S505).

According to the above steps S504 and S505, in the operation example of FIG. 3 described above, shortly after the occurrence of the key press event t6, the musical tone waveform data 214 for the second musical tones with the layer timbre of a chord of the pitch data of the three notes corresponding to the key press events t4, t5, and t6 is output from the sound source LSI 204 during the respective periods of the gray broken lines in the portions t4, t5, and t6 of FIG. 3. Similarly, shortly after the occurrence of the key press event t14, the musical tone waveform data 214 for the second musical tones with the layer timbre of a chord of the pitch data of the four notes corresponding to the key press events t11, t12, t13, and t14 is output from the sound source LSI 204 during the respective periods of the gray broken lines in the portions t11, t12, t13, and t14 of FIG. 3.

After the sound production instruction for the layer tone is issued in step S504 and the layer mode on is set in step S505, or when it is determined that the current value of the number of notes variable is less than N and the determination in step S503 becomes NO, the CPU 201 clears the value of the elapsed time variable stored in the RAM 203 to 0 (step S506).

Further, the CPU 201 clears the value of the current number of notes variable stored in the RAM 203 to 0 (step S507).

Thereafter, the CPU 201 ends the elapsed time monitoring process shown in the flowchart of FIG. 5, and returns to the main program process (not shown).

In the operation explanatory diagram of FIG. 3 described above, the key pressing event t3 occurs after the key pressing events t1 and t2. However, when the elapsed time T that defines simultaneous key pressing time period has passed since the key pressing event t1 (when the determination in step S502 is YES), the value of the current number of notes variable is 2 (corresponding to the key pressing events t1 and t2). Therefore, the threshold number of notes N=3 has not been reached (the determination in step S503 is NO). As a result, the sound production instruction processing (step S504) and the layer mode on processing (step S505) of the second musical tone in the layer tone are not executed, and the value of the elapsed time variable is set to 0 in step S506, and in the step S507, the value of the current number of notes variable is cleared to 0. As a result, in the processing of the flowchart of FIG. 4 described above, the determination in step S403 is the layer mode off, the determination in step S404 is YES, and step S405 is executed. Therefore, the measurement process of the elapsed time for transitioning from layer mode off to layer mode on starts again at the key pressing event t3. That is, if the number of notes N (=3 here) for a chord playing is not satisfied when the elapsed time T, which defines simultaneous key pressing time period, has been reached, the requirements for transitioning from the layer mode off to the layer mode on are judged again starting from the next key pressing event (=t3) that occurs immediately after that.

Figures 6A, 6B, 6C, 6D:
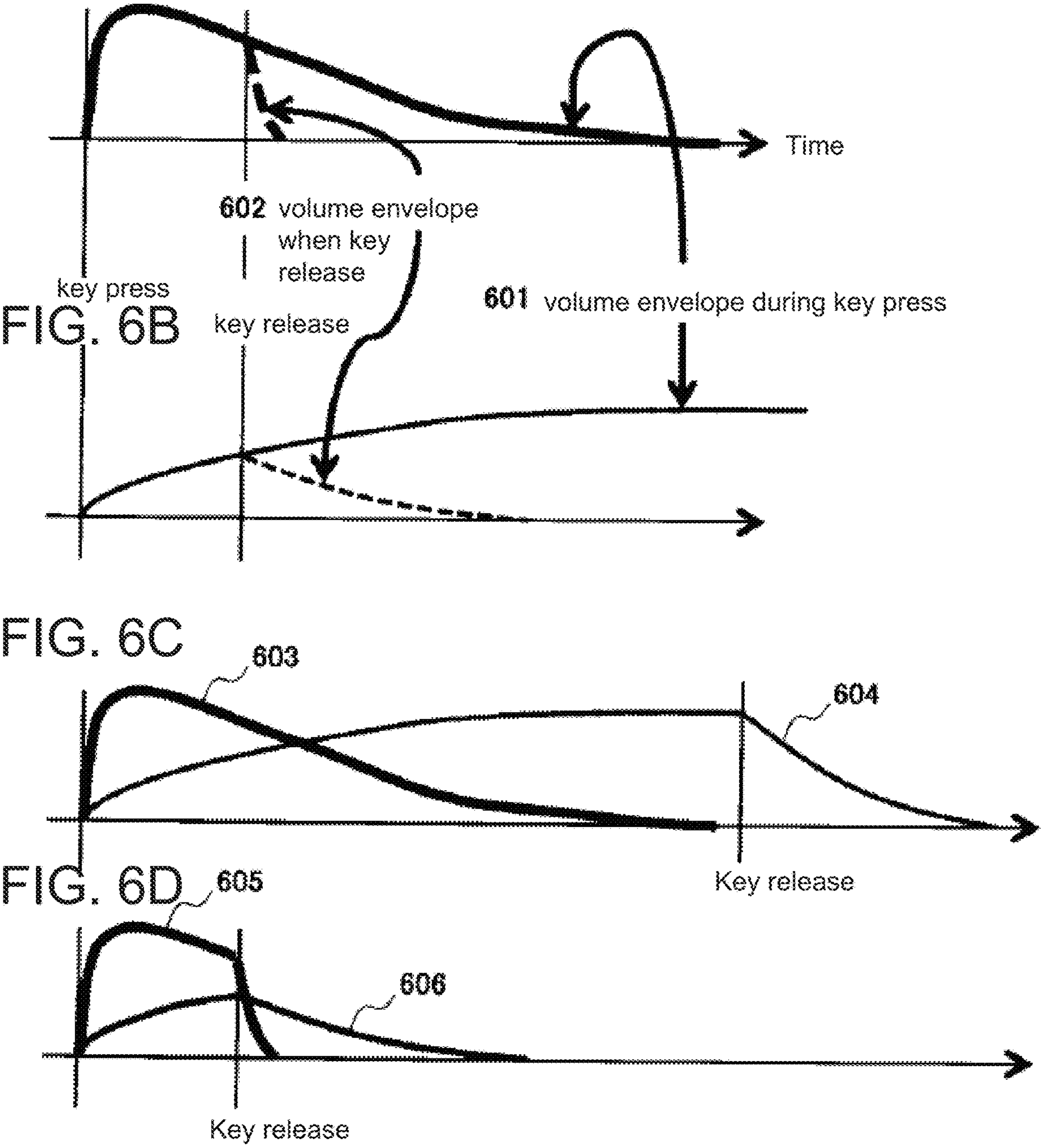
FIGS. 6A-6D are explanatory drawings (second example) showing an operation example of an embodiment.

FIGS. 6A-6D are an explanatory diagrams (second example) showing an operation example of an embodiment of the present disclosure. FIG. 6A is a diagram showing the time domain amplitude characteristics of a first musical tone suitable as a basic timbre, and FIG. 6B is a diagram showing the time domain amplitude characteristics of the second musical tone suitable as a layer timbre.

As described above, the possible basic timbres (first timbre) having the time-range amplitude characteristics of FIG. 6A may include at least one of an acoustic piano, an acoustic guitar, and a marimba. The time-range amplitude characteristics of the first musical tone of the basic timbre have a fast rising rate (to the peak) when the key is pressed (601 in FIG. 6A) and have a fast decay rate when the key is released (until the sound almost disappears) (602 in FIG. 6A). For example, the rising time is 5 ms, and decay time upon key release is 100 ms.

As described above, the possible layer timbres (second timbres) having the time domain amplitude characteristic of FIG. 6B may include at least one of strings and choir. The time-range amplitude characteristics of the second musical tone of the layer timbre have a relatively slow rising rate (to the peak) when the key is pressed (601 in FIG. 6B) and have a relatively slow decay rate when the key is released (until the sound almost disappears) (602 of FIG. 6B), thereby producing a slow continuous sound. For example, the rising time is 2 seconds, and the decay time upon key release is 3 seconds.

FIG. 6C is a diagram showing how the first musical tone 603 of the basic timbre and the second musical tone 604 of the layer timbre are superimposed with each other when playing a long note (a key is pressed for a long time), and FIG. 6D is a diagram showing how the first musical tone 605 of the basic timbre and the second musical tone 606 of the layer timbre are superimposed with each other when playing a short note (a key is pressed for a short time).

When playing a long note, two contrasting tones, the first musical tone 603 of the basic timbre and the second musical tone 604 of the layer timbre, are generated at the same time. At the time of key pressing, the first musical tone 603 of the basic timbre is dominant, and later in time and when the key is released, the second musical tone 604, which is a layer timbre with a slow rise and decay, is produced in the form of crossfading, thereby realizing a comfortable thick sound especially when playing a chord.

On the other hand, when playing a short note, the first musical tone 605 of the basic timbre, which has a rapid decay, is quickly attenuated, and the second musical tone 606 of the layer timbre, which has a longer decay, remains. As a result, when a quick single note phrase is played, the rising tone of the first musical tone 605 of the basic timbre corresponding to the current key press and the attenuated tone of the second musical tone 606 of the layer timbre corresponding to the immediately preceding key press overlap, and a distorted sound is produced.

Therefore, by taking into account the fact that long notes are mainly used in chord playing, short notes are often used in single-tone solo performance as well as the fact that the second musical tone of the layer timbre has a slow rise, thereby not affecting the performance even if a slight delay in sound production occurs, the above-described embodiment is controlled such that the second musical tones of the layer timbre are not generated except when the user's performance is regarded as a chord playing.

That is, although the production of the second musical tones of the layer timbre is suspended while the key press is being monitored for a certain period (T=25 milliseconds in the above embodiment) in order to determine whether or not a chord is played, because the layer timbre is a tone for which a rise time of about 1 to 2 seconds is set, a delay of such a degree provides almost no influence on music.

As described above, in this embodiment, a basic timbre that is always sounded when a key is pressed and a layer timbre that is sounded only when the layer mode is on for the key is pressed are selected in advance, and it is judged whether or not the user's performance is a chord playing based on the number of keys pressed and the time interval of the multiple key presses. Then, the layer mode on status is set with respect to only the note group corresponding to the pressed keys that are determined to be a chord playing, and the corresponding second musical tones of the layer timbre for the note group are produced.

According to the above embodiment, because the unison effect can be automatically added only to the required musical tones by the performer performing naturally without performing any special operations, the performer can concentrate on his/her own performance without compromising the performance or musical tones.

In addition to or as an alternative to the embodiment described above, one or more of the following features can also be implemented.

1. Enable the unison performance function with the layer timbre only in a specific key range, for example, in the key range of C3 or lower.

2. Enable the unison performance function with the layer timbre only in a specific velocity range, for example, only for sounds with a velocity value of 64 or less.

3. If a solo performance (non-layer performance) is recognized, the unison performance function with the layer timbre will not be activated for a certain set period of time. For example, while performing a solo performance that does not meet the conditions for transition to the layer mode on, even if a chord is played for a moment, the system will not transition to the layer mode on and will be regarded as part of the solo for a duration of 3 seconds, for example.

4. When the legato playing method is recognized, the unison playing function with layer timbre is activated.

In the above-described embodiments, an example in which the unison playing function by the layer timbre is implemented in the electronic keyboard instrument 100 has been described, but the present function may also be implemented in an electronic string instrument such as a guitar synthesizer or a guitar controller.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. An electronic musical instrument, comprising:
- a plurality of performance elements that specify pitch data;
- a sound source that produces musical sounds; and
- a processor configured to perform the following:
  - when a user plays a set plural number of the performance elements simultaneously within a set time period, thereby defining a chord playing, instructing the sound source to produce a sound of a first timbre and a sound of a second timbre, both corresponding to a pitch data specified by the set plural number of the performance elements played by the user; and
  - when a user performance of the plurality of performance elements is not the chord playing, instructing the sound source to produce the sound of the first timbre corresponding to the pitch data specified by the user performance and not instructing the sound source to produce the sound of the second timbre.

2. The electronic musical instrument according to claim 1, wherein the processor sets a layer mode variable to an on value when the chord playing occurs, and wherein when a new operation of the plurality of performance elements is subsequently detected while the layer mode variable is set to the on value, the processor instructs the sound source to produce a sound of the first timbre corresponding to a pitch data specified by the new operation, and does not instruct the sound source to produce a sound of the second timbre for the pitch specified by the new operation.

3. The electronic musical instrument according to claim 2, wherein when the processor instructs the sound source to mute all of the sound of the first timbre and all of the sound of the second timbre while the layer mode variable is set to the on value, the processor changes the layer mode variable to an off value.

4. The electronic musical instrument according to claim 1, wherein the first timbre is one of an acoustic piano, an acoustic guitar, and a marimba, and wherein the second timbre is one of strings and choir.

5. The electronic musical instrument according to claim 1, wherein a volume envelope for the first timbre is set to rise faster than a volume envelope for the second timbre in response to the user playing of the set plural number of the performance elements that has caused the chord playing.

6. The electronic musical instrument according to claim 1, wherein a volume envelope for the first timbre is set to decay faster than a volume envelope for the second timbre in response to a release operation on any one of the set plural number of the performance elements that has caused the chord playing.

7. A method of sound production performed by a processor in an electronic musical instrument that includes, in addition to the processor, a plurality of performance elements that specify pitch data and a sound source that produces musical sounds, the method comprising, via said processor:
- when a user plays a set plural number of the performance elements simultaneously within a set time period, thereby defining a chord playing, instructing the sound source to produce a sound of a first timbre and a sound of a second timbre, both corresponding to a pitch data specified by the set plural number of the performance elements played by the user; and
- when a user performance of the plurality of performance elements is not the chord playing, instructing the sound source to produce the sound of the first timbre corresponding to the pitch data specified by the user performance and not instructing the sound source to produce the sound of the second timbre.

8. The method according to claim 7, further comprising
- setting a layer mode variable to an on value when the chord playing occurs; and
- when a new operation of the plurality of performance elements is detected while the layer mode variable is set to the on value, instructing the sound source to produce a sound of the first timbre corresponding to a pitch data specified by the new operation, and not instructing the sound source to produce a sound of the second timbre.

9. The method according to claim 8, further comprising:
- when the sound source is instructed to mute all of the sound of the first timbre and all of the sound of the second timbre while the layer mode variable is set to the on value, changing the layer mode variable to an off value.

10. A non-transitory computer-readable storage medium storing a program executable by a processor in an electronic musical instrument that includes, in addition to the processor, a plurality of performance elements that specify pitch data and a sound source that produces musical sounds, the program causing the processor to perform the following:
- when a user plays a set plural number of the performance elements simultaneously within a set time period, thereby defining a chord playing, instructing the sound source to produce a sound of a first timbre and a sound of a second timbre, both corresponding to a pitch data specified by the set plural number of the performance elements played by the user; and
- when a user performance of the plurality of performance elements is not the chord playing, instructing the sound source to produce the sound of the first timbre corresponding to the pitch data specified by the user performance and not instructing the sound source to produce the sound of the second timbre.

* * * * *